United States Patent
Talja et al.

(10) Patent No.: US 6,985,371 B2
(45) Date of Patent: Jan. 10, 2006

(54) OUTPUT CHOKE ARRANGEMENT FOR INVERTER, AND METHOD IN CONJUNCTION THEREWITH

(75) Inventors: Markku Talja, Järvenpää (FI); Simo Pöyhönen, Vantaa (FI); Juha Mikkola, Vihti (FI); Teemu Ronkainen, Espoo (FI); Marko Raatikainen, Espoo (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 11/060,321

(22) Filed: Feb. 18, 2005

(65) Prior Publication Data

US 2005/0141253 A1 Jun. 30, 2005

Related U.S. Application Data

(63) Continuation of application No. PCT/FI2003/000618, filed on Aug. 21, 2003.

(30) Foreign Application Priority Data

Aug. 22, 2002 (FI) .................................. 20021514

(51) Int. Cl.
*H02M 1/12* (2006.01)

(52) U.S. Cl. ....................................................... 363/40

(58) Field of Classification Search ................. 363/39, 363/40, 131, 132; 323/205, 207

See application file for complete search history.

(56) References Cited

U.S. PATENT DOCUMENTS

| | | | | |
|---|---|---|---|---|
| 4,502,106 A | * | 2/1985 | Glennon | .................. 363/56.02 |
| 5,450,309 A | | 9/1995 | Rohner | |
| 5,694,051 A | | 12/1997 | Ueyama et al. | |
| 6,291,987 B1 | | 9/2001 | Dean et al. | |
| 6,452,819 B1 | * | 9/2002 | Wobben | ...................... 363/40 |

FOREIGN PATENT DOCUMENTS

| | | |
|---|---|---|
| EP | 0848492 A1 | 6/1998 |
| EP | 1017147 A2 | 7/2000 |
| EP | 1017147 A3 | 7/2001 |
| EP | 1137160 A2 | 9/2001 |
| EP | 1137160 A3 | 12/2002 |
| WO | 0126210 A1 | 4/2001 |

OTHER PUBLICATIONS

ELFA—Catalog No. 47, p. 632, 1998.

* cited by examiner

*Primary Examiner*—Adolf Berhane
(74) *Attorney, Agent, or Firm*—Dykema Gossett PLLC

(57) ABSTRACT

A choke arrangement and a method in conjunction with an inverter, the phase output of the inverter being configured to be composed of two or more parallel branches, each of which comprises an upper (V1, V3, V5) and a lower (V2, V4, V6) power semiconductor component at the output, the upper one of which being coupled to a positive voltage of a direct voltage intermediate circuit and the lower to a negative voltage, the components being in series, the output of each branch being composed of a point between the components. The arrangement comprises branch-specific single-phase chokes (L1, L2, L3), the first ends of which chokes are arranged to be coupled to the outputs of the power semiconductor components and the second ends together to form the phase output of the inverter.

7 Claims, 6 Drawing Sheets

OUTPUT CHOKE ARRANGEMENT FOR INVERTER, AND METHOD IN CONJUNCTION THEREWITH

CROSS-REFERENCE TO RELATED APPLICATION

This is a continuation of International Application No. PCT/FI2003/000618, filed Aug. 21, 2003.

BACKGROUND OF THE INVENTION

The present invention relates to a choke arrangement in accordance with the preamble of independent claim 1, and to a method in conjunction with an output choke of an inverter in accordance with the preamble of independent claim 5.

An inverter is a device typically used for controlling motors in an economical and reliable manner. At its output, such an inverter generates a voltage or a current with a controllable frequency, enabling a motor to be controlled in an optimal manner in accordance with a desired frequency of the output.

A frequency converter equipped with a voltage intermediate circuit, one being shown in FIG. 7 for the sake of example, generates at its output by means of an inversion part 73 voltage pulses which are short with respect to the basic frequency and whose duration is adjusted to achieve a desired output voltage. Such a frequency converter with a voltage intermediate circuit is provided with a direct voltage intermediate circuit Udc whose positive and negative voltages are coupled as voltage pulses to phased outputs as desired. One phase is thus provided with an upper 71 and a lower 72 semiconductor switch, and the output voltage of the phase is obtained from between the switches. FIG. 7 further shows a motor M controlled by a frequency converter, and an input transformer 74.

These short and fast voltage pulses are generated by power semiconductors resistant to high currents and voltages. Nowadays IGB (insulated gate bipolar) transistors are commonly used for their good properties. An IGBT is capable of cutting off a current of even hundreds of amperes, the maximum voltage of a component being thousands of volts, correspondingly.

In high-current inverters, however, IGBT components have to be coupled in parallel to achieve the necessary current strength. IGBT components are often packed into modules such that one module comprises several IGBT switches and their zero diodes. A natural alternative of parallel coupling the switches of the output of an inverter is then to couple some switches of one module in parallel. Applications that require parallel coupling of several components are typically three-phase ones. Each phase then comprises components coupled in parallel, and these parts of parallel coupling are generally called branches. One phase of an output of an inverter is then composed of a number of branches corresponding to the number of upper and lower switch components coupled in parallel.

In voltage intermediate circuit frequency converters, an output voltage is generated in an inversion part from voltage pulses which, when using existing switch components, have extremely high rates of rise. In a cable between an inverter and a rotatable machine, high rates of voltage rise cause voltage oscillations which strain the insulating materials of the machine. In addition to the rate of voltage rise, the amplitude and frequency of voltage oscillations are determined by the length of such a cable and wave impedance, the wave impedance of the machine as well as other electrical interfaces between the inverter and the machine. The minimum length of a cable to enable maximum reflection to take place in a terminal of a machine is called the critical length of the cable.

A choke at an output of an inverter enables the above-disclosed critical length of a cable to be increased. The desired rate of voltage rise determines the magnitude of the inductance of the choke. The magnitude of the necessary inductance can be reduced by an RC circuit, as shown in FIG. 2. However, using an RC circuit increases losses of drive and may hinder the operation of the control of some inverters.

Conventionally, the rate of voltage rise has thus been restricted by chokes installed at an output of an inverter, which are either single-or three-phase ones. FIG. 1 shows the basic structure of both a single-phase and a three-phase choke. A choke comprises a winding 1 wound around a core 2. The core is usually rectangular in shape and comprises at least one air gap to prevent saturation. In some cases, different voltage cutters are also used for reducing maximum voltages, e.g. as shown in FIG. 3. Here, a diode bridge 31 is coupled to an output of an inverter to cut the voltage of the output when it becomes higher than a voltage Udc of an intermediate circuit.

A high rate of voltage rise also increases a circulating current passing via bearings. It can be roughly said that the circulating bearing current is proportional to the common-mode voltage of a motor and to the resulting current passing through distributed capacitances. This current may be reduced by reducing the rate of voltage rise of the output voltage of an inverter. In addition to an output choke L of an inverter, a special bearing current filter, one being shown in FIG. 8, comprises a common-mode choke Lcomm e.g. in a direct voltage intermediate circuit or at the output of the inverter as well as a capacitance CE installed between a star point of an RC circuit and a ground plane.

Irrespective of whether or not an inverter is equipped with IGBTs in parallel, the purpose of an output choke is to reduce the rate of voltage rise and the amplitude to such a low level that voltage oscillations are incapable of damaging the insulating materials of a rotatable machine and that the current passing via a bearing does not cause any damage to the bearing.

In the known solutions, in conjunction with IGB transistors coupled in parallel, the outputs of the IGB transistors are directly coupled in parallel to form a phase output, a choke being connected to the common current path of this parallel coupling to restrict the rate of voltage rise. In order to prevent saturation of the core of the choke and, on the other hand, to obtain the necessary inductance, the cross-sectional area of the core has to be sufficiently large. Since the current allowed by the components coupled parallel is also high, the necessary choke thus ends up being very large and heavy.

A problem with the direct parallel coupling of IGBT switches is presented by differences between the currents of parallel coupled branches that occur in normal switching situations. The current differences between branches are caused by differences between the mutual conductances and gate capacitances of IGBT switches as well as factors due to a gate driver, such as time diversity of gate control signals and differences between gate voltages and gate resistances. Due to the non-ideality of switch components coupled in parallel and-the circuits controlling such components, an output current of a phase is distributed unevenly between the components during switching situations.

For instance, when switches are being switched off and when one switch starts cutting off the current before the rest of the switches in the same phase, some of the current transfers to other switch components of the particular phase. It has been noted that this increase of current with respect to the dimensioned switch-specific phase current is anything up to dozens of percents. This potential increase of current should be taken into account when designing an inverter. The differences between branch currents reduce the maximum capacity of the inverter because the output current has to be restricted to a level which does not allow the temporary current strength of switch components to be exceeded, not even in the branch with the highest current. The switches thus cannot, be dimensioned on the basis of a phase current only, since such dimensioning could result in a damaged switch component, caused by currents transferring in switching situations.

Another problem in connection with the existing, rigidly parallel coupled branches is that an erroneously operating single-branch power switch, such as an IGBT switch, cannot be identified.

BRIEF DESCRIPTION OF THE INVENTION

An object of the present invention is to provide a choke arrangement for an output of an inverter, which avoids the above-mentioned drawbacks and enables chokes to be dimensioned smaller and power semi-conductors of an output of an inverter to be utilized better than before despite the non-idealities thereof. This object is achieved by an arrangement of the invention, which is characterized by what has been disclosed in the characterizing part of independent claim 1.

The arrangement of the invention is based on the idea that single-phase chokes are used in conjunction with output branches coupled in parallel such that the actual phase output is formed by second ends of the chokes coupled in parallel. Such an arrangement enables the branches coupled in parallel and their power semiconductors in particular not to be tightly coupled together in parallel, which means that the power semiconductors operate considerably more evenly in parallel. In addition, the output choke arrangement enables the advantages achieved even by normal output chokes to be achieved.

The invention also relates to a method according to claim 5, which is characterized by what has been disclosed in the characterizing part of the independent claim. The method of the invention is based on utilizing the arrangement of the invention, the method enabling a certain previously undetectable fault situation of switches to be detected. The method of the invention based on using the arrangement enables a semiconductor switch of an output that has been erroneously conveyed to be conductive or that has erroneously remained conductive to be determined and, when necessary, the control of a device to be ended to prevent even more serious potential damage from incurring to the inverter itself or the device controlled therewith.

BRIEF DESCRIPTION OF THE DRAWINGS

The invention is now described in closer detail in connection with preferred embodiments and with reference to the accompanying drawings, in which

FIG. 9 shows an output choke unit whose structure is line-like, and

DETAILED DESCRIPTION OF THE INVENTION

Figure 4:
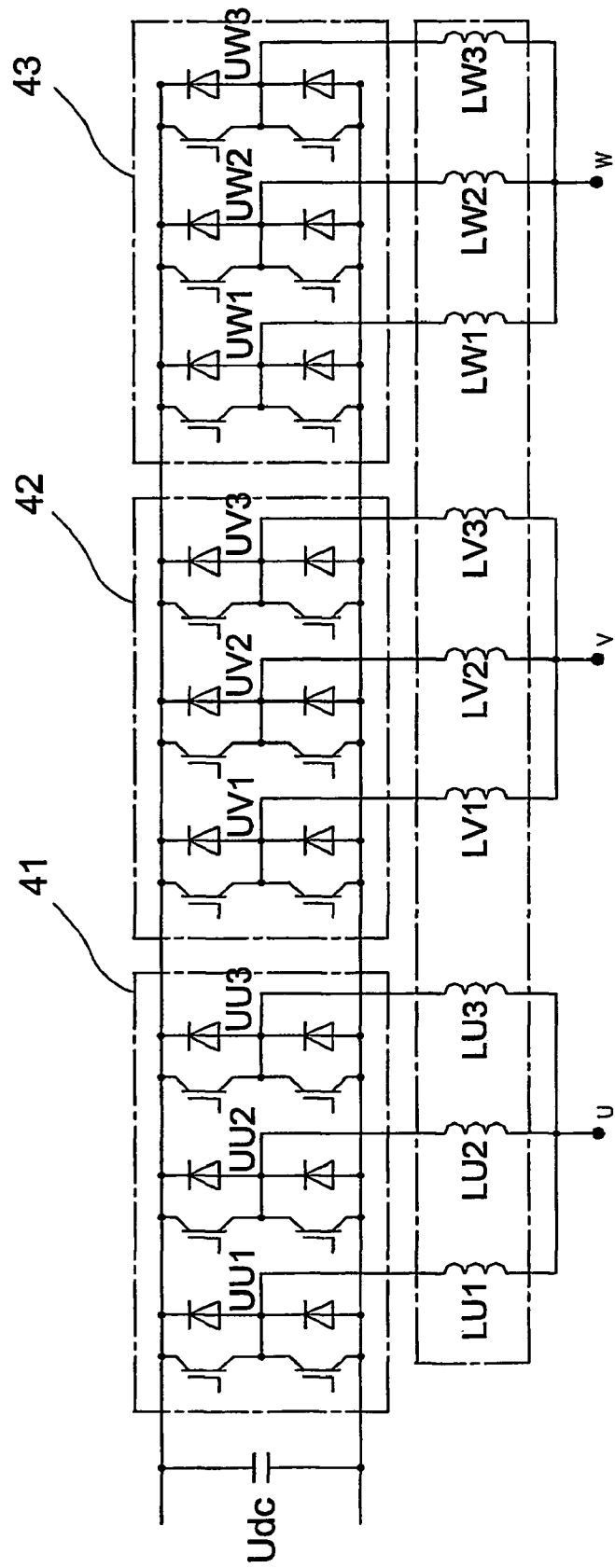
FIG. 4 shows branch-specific chokes of the invention at an output of an inverter.

FIG. 4 shows the structure of an arrangement of the invention in conjunction with an inverter. In the structure of FIG. 4, an output of each phase U, V, W comprises three branches, i.e. three parallel pairs of switches that are simultaneously controlled to achieve the necessary output current. FIG. 4 shows how the switches of each phase are composed of modules 41, 42, 43 comprising three pairs of switches, the modules being coupled to a direct voltage intermediate circuit Udc. According to the invention, the arrangement comprises branch-specific single-phase chokes LU1, LU2, LU3, LV1, LV2, LV3, LW1, LW2, LW3, first ends of coils of the chokes being configured to be coupled to outputs UU1, UU2, UU3, UV1, UV2, UV3, UW1, UW2, UW3 of power semiconductor components of the branches. As usual, these branch-specific outputs are composed of points between upper and lower power switches. The potential of these points is controlled by the power switches, alternately to the positive and the negative potential of the voltage intermediate circuit.

According to the invention, second ends of the single-phase chokes are further configured to be coupled together, resulting in a phase output U, V, W of the inverter, which is further coupled to load for controlling the same.

Figure 5:
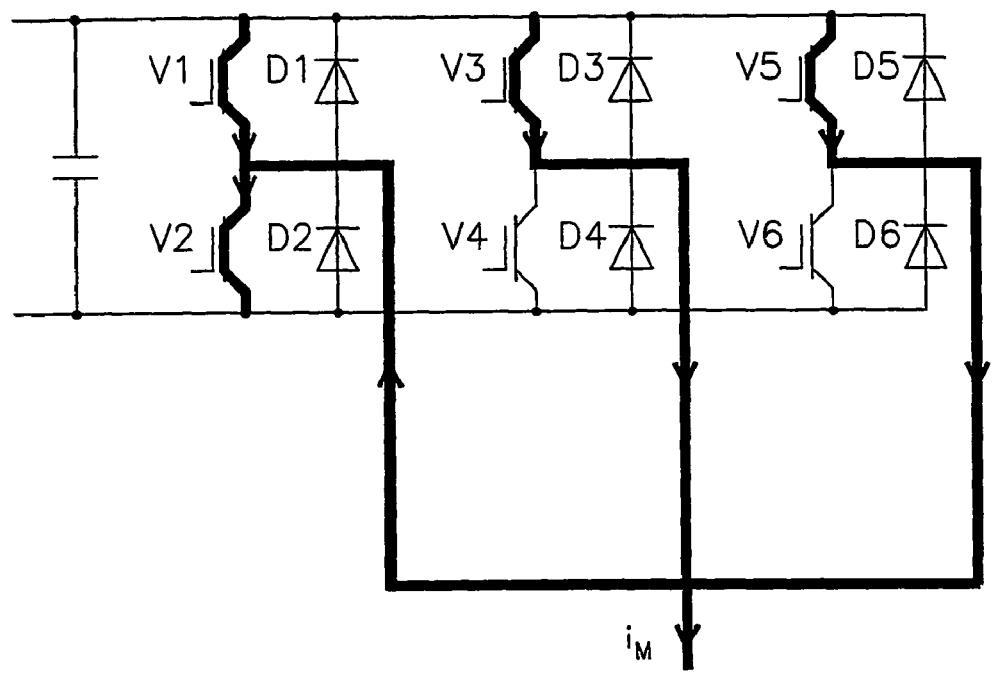
FIG. 5 shows breakthrough in an output phase of an inverter, wherein branches are rigidly coupled in parallel.

The operation of the arrangement of the invention will be described in the following, with reference to FIGS. 5 and 6. FIG. 5 shows a prior art direct parallel coupling of branches for increasing current capacity. Outputs of power semiconductor components, which are preferably IGBT switches or corresponding fast components, are then directly coupled in parallel. The points between all upper V1, V3, V5 and lower V2, V4, V6 power semiconductors in the coupling are thus in exactly the same potential.

Since switch components and control circuits controlling the switch components always differ from each other to some extent, despite the same control, the components tend to become switched off and on at different times and at different rates. This results in a situation wherein e.g. in connection with switching off a component, one of the switches tends to be switched off before another. In a switch-off situation, for instance in an IGBT switch the voltage over a component tends to rise before the current decreases. Since, however, the voltage of all branches is the same, the voltage is not allowed to rise as desired, and some current transfers from the component that first started becoming switched off to the components of other branches. Even though typical delays are no larger than of the order of nanoseconds, this causes considerable current transfers to other components.

Figure 6:
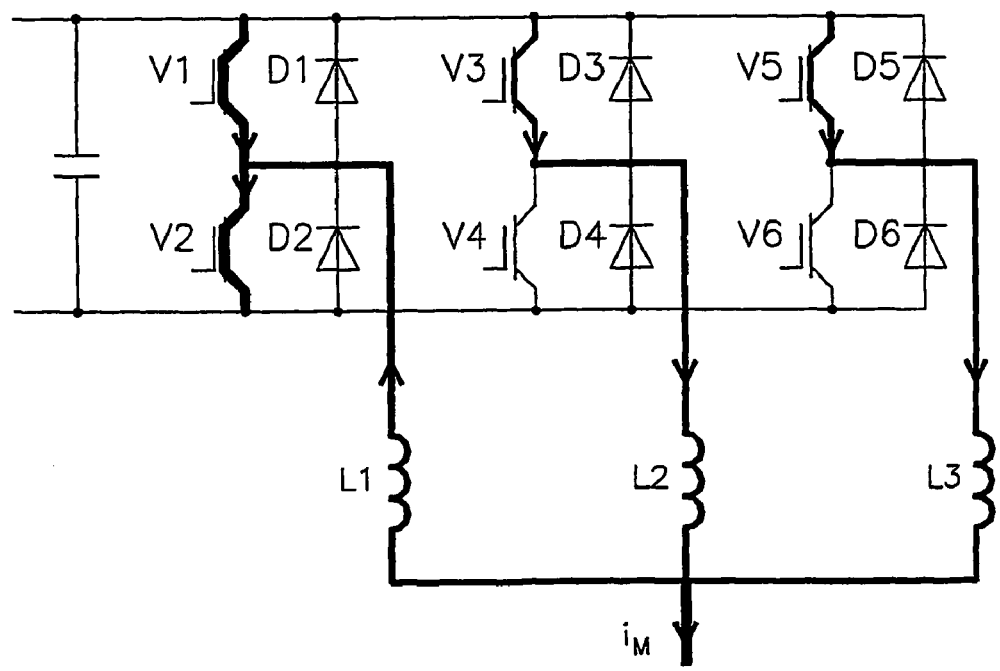
FIG. 6 shows breakthrough in an output phase of an inverter, comprising branch-specific chokes of the invention.
Figure 7:
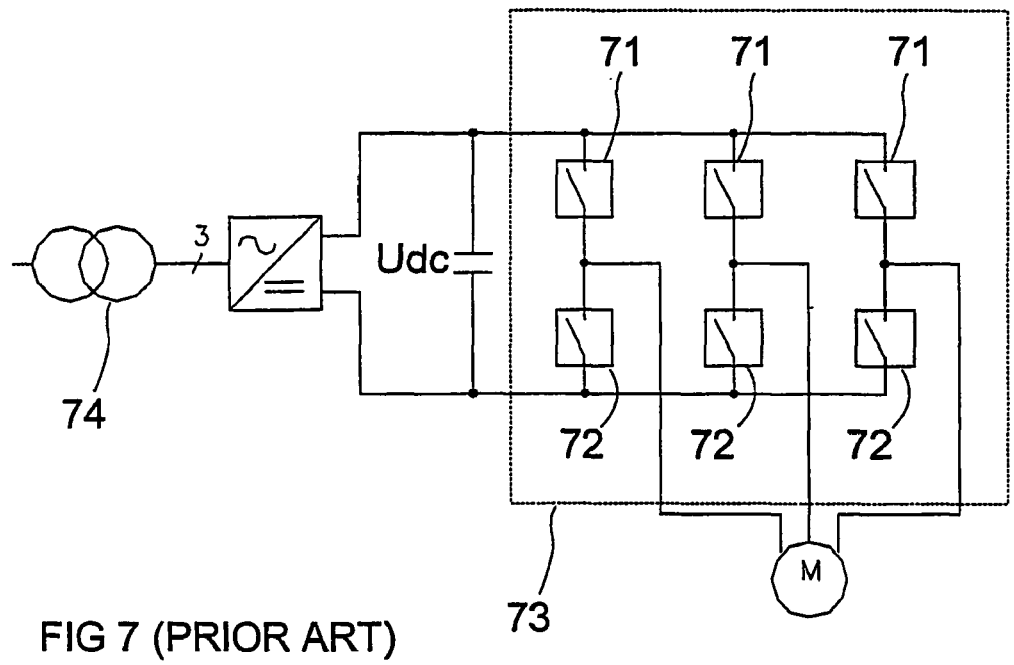
FIG. 7 shows a voltage intermediate circuit frequency converter.
Figure 8:
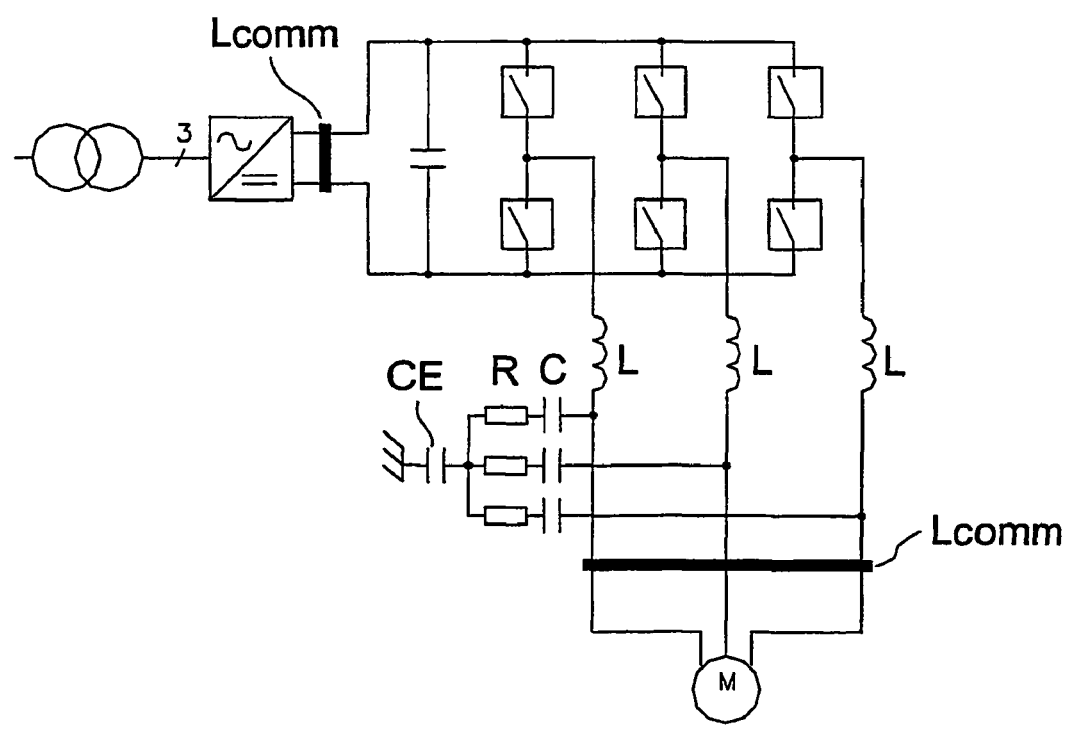
FIG. 8 shows a bearing current filter.

FIG. 6 shows a coupling of one output phase according to the invention, comprising three branches. Chokes are coupled to a point between each pair of switches, the second ends of the chokes further being coupled together to form a phase output. In the solution of the invention, the above-mentioned non-idealities of the IGBTs and gate drivers cause temporary voltage differences between the output branches of IGBT switches that affect over the chokes, the currents of the branches changing with respect to each other at a rate determined by the above-mentioned voltage differences and the inductance of the chokes. Using the chokes in a manner in accordance with the invention enables the magnitude of current transferred to other switches to be reduced considerably, enabling the switches to be dimensioned more accurately, taking into account load current only.

The arrangement of the invention enables the method of the invention to be implemented. This method can be used for determining a certain type of failure in connection with power semiconductors coupled in parallel. The method of the invention will be further described with reference to FIGS. 5 and 6.

In fault situations wherein only one of the IGBT switches V2 coupled in parallel is erroneously conveyed to be conductive or erroneously remains conductive when others V4 and V6 are switched off while power switches V1, V3 and V5 of an opposite branch have been or are being conveyed to be normally conductive, a fault current in its entirety passes via this one switch V2. Such a situation is shown in FIG. 5 in conjunction with a conventional direct parallel coupling of branches. In such a case, the current becomes high enough for the IGBT V2 to-be conveyed to an unsaturated state, restricting the fault current to a value according to its gate voltage. FIG. 5 shows how the fault current also passes via the switches V3 and V5 and through the switch V2 to a negative rail of a direct voltage intermediate circuit.

If the output branches of the IGBT switches are coupled rigidly in parallel, the same fault current travels in the opposite branch, with the load current $I_M$ added thereto or subtracted therefrom, via a plurality of parallel IGBTs V1, V3 and V5, in which case the current of each single IGBT remains lower, correspondingly. A dropout voltage of these IGBTs then also remains at a few volts only, i.e. it is only slightly different from the dropout voltage with a normal load current, making a fault substantially more difficult to detect.

The travel of a fault current can be affected by the arrangement of the invention wherein a choke is coupled to every output branch of a pair of IGBT switches and the branches are coupled in parallel only after the chokes, as shown in FIG. 6. This does not substantially affect the magnitude of the fault current but it does affect the travel of current such that in the branch in which all parallel power switches V1, V3 and V5 have been conveyed to be conductive, a fault current first travels only via one power switch V1, only gradually transferring to the other switches V3 and V5 coupled in parallel at a rate determined by differences between the inductances of the chokes and the dropout voltages of the switches. In such a case, the dropout voltage of the power switch V1 via which the entire fault current travels first ends up being substantially higher than that in a corresponding fault situation with no branch-specific chokes. The dropout voltage of the particular IGBT decreases gradually as the current also transfers to the parallel IGBTs V3 and V5, but appropriate dimensioning of the chokes enables the dropout voltage to stay high enough to enable a fault situation to be detected based on measuring a collector voltage of the IGBT. The aim of dimensioning the choke is to achieve a dropout voltage that is e.g. about 7 to 10 volts higher than the dropout voltage with a normal load current.

The method of the invention thus works such that a voltage limit and a time limit are predetermined to be used for indicating a fault situation. A voltage limit is the voltage above which a dropout voltage of a component should reside in order for a fault situation to be detected in a reliable manner. A time limit is used to prevent a fault situation to be indicated erroneously in normal switching situations when the dropout voltage of an IGBT for a short period of time resides above the above-mentioned voltage limit. Further according to the invention, control information on power semiconductor components of the branches is determined. The control information on the components is obtained e.g. directly from the processor executing the control.

Further, in accordance with the invention, a collector voltage of the power semiconductor components of the branches is determined in those power semiconductor components that have been conveyed to a conductive state. The collector voltage, i.e. the dropout voltage, can be measured in a normal manner, utilizing measurement circuits typically already existing in control circuits or gate drivers. According to the invention, a fault situation is detected in the power semiconductor component the collector voltage of a power semiconductor component coupled in series therewith exceeds the predetermined voltage limit for a period of time longer than the predetermined time limit. Thus, by determining the collector voltage of controlled switches, it may be concluded whether or not a switch below or above the particular switch inadvertently remains in a conductive state or has inadvertently been conveyed to such a state.

According to a preferred embodiment of the method of the invention, the power switches are switched off after a fault has been detected, in which case a fault current is cut off. Alternatively, or in addition thereto, an alarm signal may also be produced to indicate a failure, which signal is forwarded to an inverter, or an operator of a process used by the inverter is informed formed of such an alarm signal.

Figure 1:
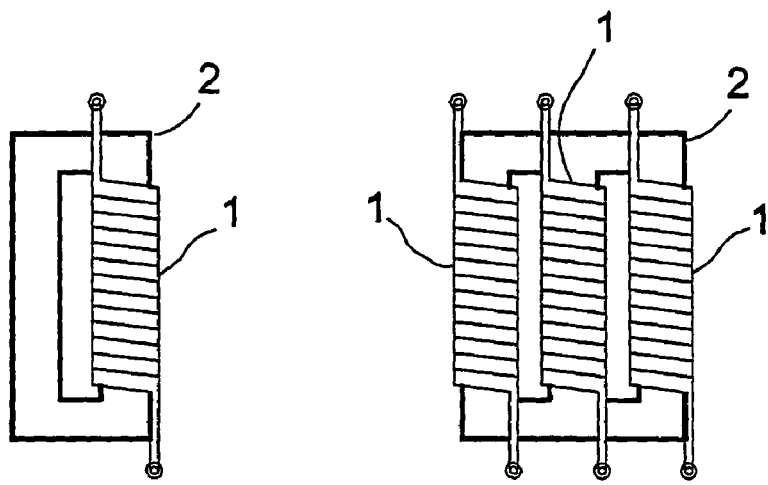
FIG. 1 shows conventional single- and three-phase choke structures.
Figure 2:
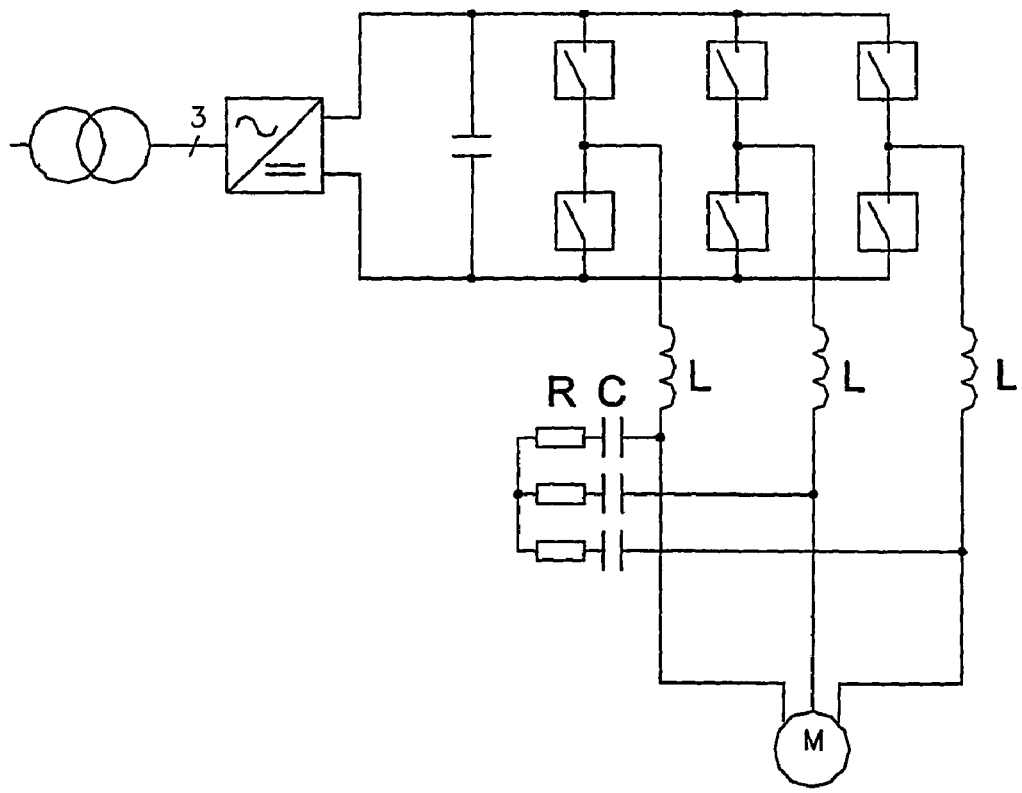
FIG. 2 shows an LCR filter at an output of an inverter.
Figure 3:
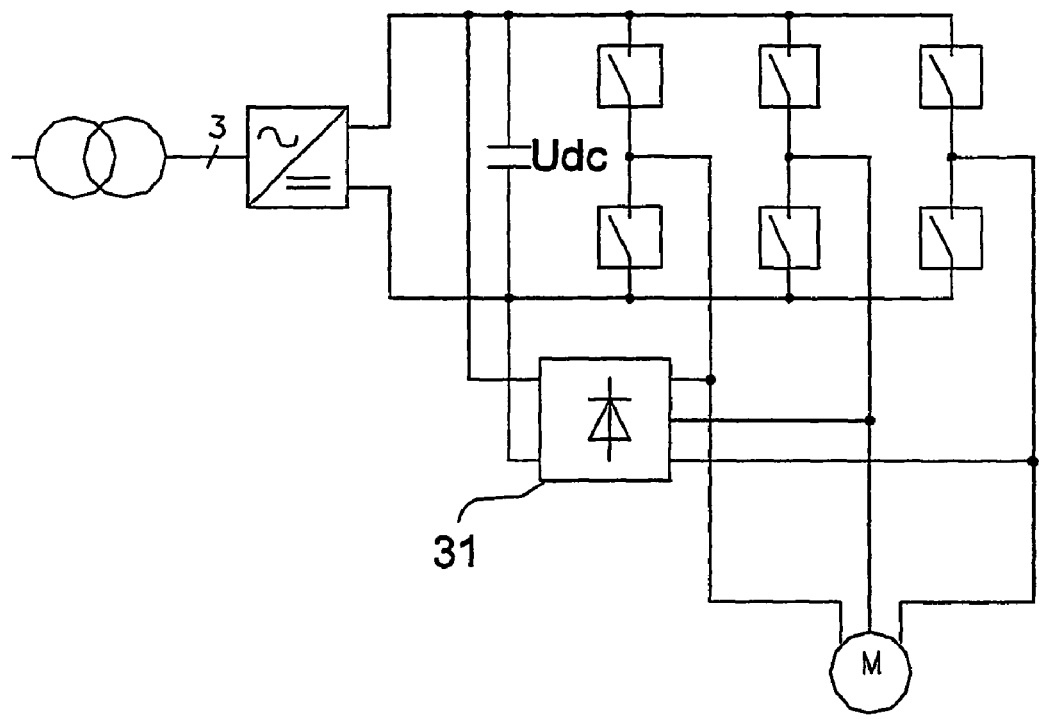
FIG. 3 shows a voltage cutter at an output of an inverter.

According to the arrangement of the invention, the chokes are composed of single-phase yokeless chokes. In other words, the winding of a choke is formed around a core that does not close. FIG. 1 shows conventional single- and three-phase chokes where the magnetic core material is provided with a yoke, i.e. a magnetic flux formed in the core material is to be closed along the core.

Figure 9:
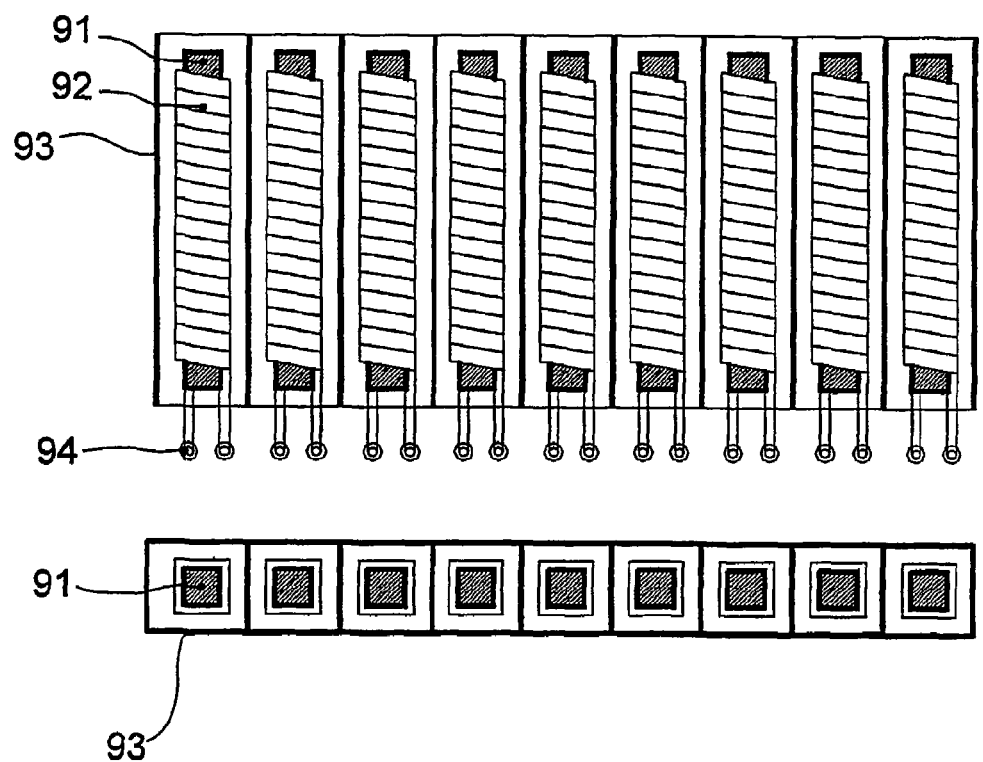
Figure 10:
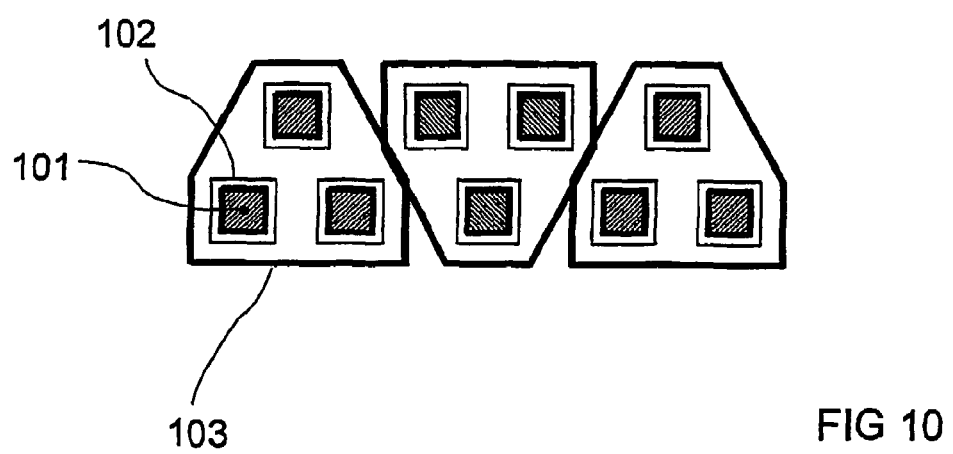
FIG. 10 shows an output choke unit whose chokes are arranged symmetrically with respect to each other.

FIGS. 9 and 10 show choke structures suitable for use in the arrangement of the invention. FIG. 9 discloses the structure of a yokeless single-phase choke, although the figure shows an entire choke unit as a transverse projection and as a vertical projection. The figure shows how a single choke is formed by winding a coil 92 around a columnar core 91. Connectors 94 of the choke are supplied from one elongated end of the choke and a metallic cover 93 is provided around the winding to prevent spreading of leakage fluxes. The choke unit shown in FIG. 9 comprises a total of nine single-phase chokes. Such a number of chokes is needed for an output of a three-phase system if every phase comprises three separate branches, as in the example of FIG. 4.

The mechanical structure of a choke should be one with no substantial magnetic coupling existing between the branch-specific chokes, or one with no magnetic coupling existing between different output phases such that the magnetic coupling between parallel branches of the same phase is small and symmetrical. Such an implementation is achieved e.g. by the line-like structure shown in FIG. 9, wherein all single chokes are protected by a metallic cover 93.

Another alternative to avoid undesired magnetic couplings is the symmetric structure shown as a vertical projection in FIG. 10. The figure discloses a core 101, a coil 102 wound around the core, and a metallic cover 103. In this solution, the chokes of parallel branches of the same output phase are coupled into a symmetrical shape. The output choke unit of FIG. 10 is designed for an inverter which comprises three parallel branches in each three phases. In this solution, the magnetic coupling between the chokes of different phases is prevented by a metallic cover, i.e. the single chokes of one phase symmetrically arranged with respect to each other are located inside one metallic cover 103.

The use of the yokeless chokes of the invention is made possible by the fact that in conjunction with conventional chokes with yokes, a high frequency magnetic flux does not close via a yoke. Consequently, a yokeless choke enables a sufficiently high inductance to be achieved at high frequencies. An important advantage of a yokeless choke is small size and light structure, as compared with the previous implementations. Consequently, manufacturing costs are also considerably lower than before.

The invention has been described above in connection with inverters comprising three parallel branches. It is obvious, however, that the invention can also be applied in such a connection wherein the number of branches is other than three. Furthermore, it is obvious to one skilled in the art that the basic idea of the invention can be implemented in many different ways. The invention and its embodiments are thus not restricted to the above-described examples but may vary within the scope of the claims.

What is claimed is:

1. A choke arrangement for an output of an inverter, a phase output of the inverter being configured to be composed of two or more parallel branches, each of which comprises an upper (V1, V3, V5) and a lower (V2, V4, V6) power semiconductor component at the output, the upper one of which being coupled to a positive voltage of a direct voltage intermediate circuit and the lower to a negative voltage, the components being in series, an output of each branch being composed of a point between the components, the arrangement comprising branch-specific single-phase chokes (L1, L2, L3), first ends of which chokes are arranged to be coupled to the outputs of the power semiconductor components and second ends together to form the phase output of the inverter, characterized in that the single phase chokes are formed around a yokeless, columnar core (91; 101).

2. An arrangement as claimed in claim 1, wherein the single phase chokes are protected by a metallic cover (93) to reduce magnetic coupling.

3. An arrangement as claimed in claim 1 wherein the single phase chokes forming one output phase are placed symmetrically with respect to each other, and that the symmetrically placed chokes are protected by a metallic cover (103) to reduce magnetic coupling.

4. An arrangement as claimed in claim 1, wherein the power semiconductor components at the output are IGBT switches.

5. A method in conjunction with output chokes of an inverter, a phase output of the inverter being configured to be composed of two or more parallel branches, each of which comprises an upper and a lower power semi-conductor component at the output, the upper one of which being coupled to a positive voltage of a direct voltage intermediate circuit and the lower to a negative voltage, the components being in series, an output of each branch being composed of a point between the components, characterized in that an output choke comprises branch specific single phase chokes, first ends of coils of which chokes are coupled to the outputs of the branches and second ends together to form the phase output of the inverter, the method comprising the steps of predetermining a voltage limit and a time limit to be used for indicating a fault situation, determining control information on the power semiconductor components of the branches, determining a collector voltage of the power semiconductor components of the branches in those power semiconductor components that have been conveyed to a conductive state, detecting a fault situation in the power semiconductor component the collector voltage of a power semiconductor component coupled in series therewith exceeds the predetermined voltage limit for a period of time longer than the predetermined time limit.

6. A method as claimed in claim 5, wherein the method further comprises a step of cutting off a fault current in a controlled manner by switching off the power semiconductor components.

7. A method as claimed in claim 5 wherein the method further comprises a step of producing an alarm signal in response to detecting a failure.

* * * * *